United States Patent
Furusawa et al.

[15] 3,652,782
[45] Mar. 28, 1972

[54] STRESS RELIEF APPARATUS FOR CABLE CONNECTION

[72] Inventors: Hisatomo Furusawa; Kazuyoshi Inaoka; Masahiro Maruyama, all of c/o Furukawa Denki Kogyo Kabushiki Kaisha, Yokohama Densen Seizosho, No. 6-1, Nishihiranuma-cho, Nishi-ku, Yokohama-shi, Kanagawa-ken, Japan

[22] Filed: Aug. 4, 1969

[21] Appl. No.: 847,161

[52] U.S. Cl. .............................................. 174/73 R, 174/19
[51] Int. Cl. .................................... H02g 15/02, H02g 15/22
[58] Field of Search .................. 174/12 BH, 19, 73 R, 73 SC, 174/75 D, 75 F, 78, 80, 142

[56] References Cited

UNITED STATES PATENTS 3,517,113  6/1970  Ono et al. ........................... 174/73 R X

*Primary Examiner*—Laramie E. Askin
*Attorney*—George B. Oujevolk

[57] ABSTRACT

A tubular body made of an elastomer has conical surfaces at both ends and an axial bore to receive the cable insulation of a sheathed cable, and is provided with a conductive stress cone.

A solid support cylinder made of an insulating material has a stress relief electrode embedded therein and exerts an axial compression on the tubular body in cooperation with a clamping member. Owing to the compression, the tubular body is brought into intimate contact with the cable insulation. The arrangement of the stress relief electrode in the support cylinder is such that it comes on an extension of the conical surface of the stress cone. The stress relief electrode is grounded.

3 Claims, 6 Drawing Figures

3,652,782
PATENTED MAR 28 1972
FIG. 1
FIG. 2
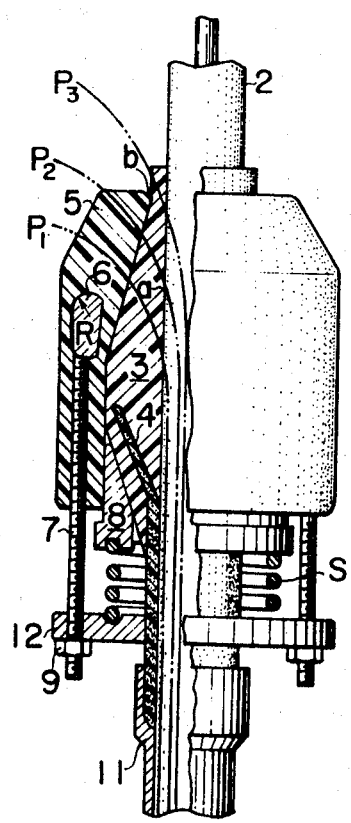
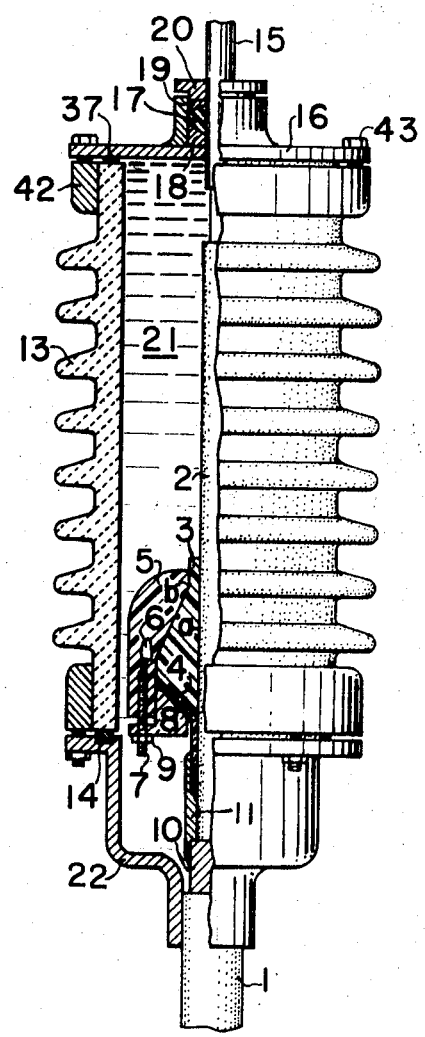
Hisatomo Furusawa
Kazuyoshi Inaoka
Masahiro Maruyama
INVENTORS
BY George B. Oujevolk
ATTORNEY

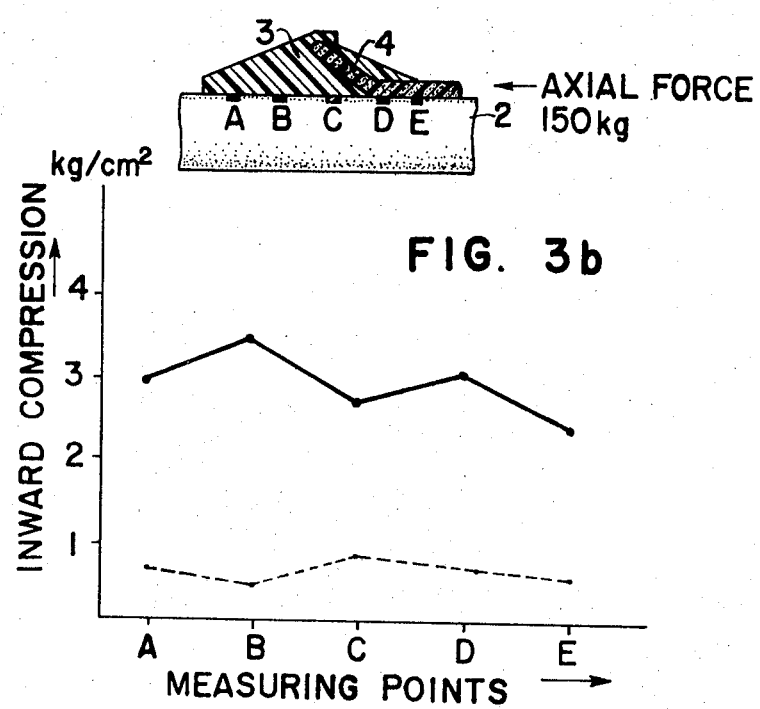
FIG. 3a
FIG. 3b
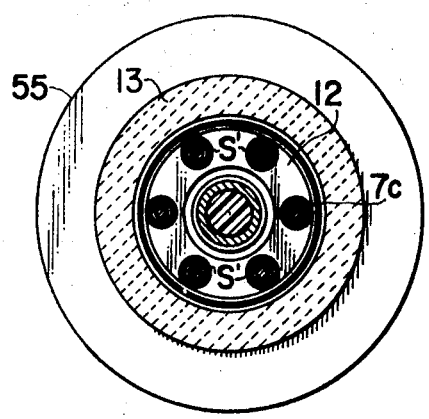
FIG. 5

STRESS RELIEF APPARATUS FOR CABLE CONNECTION

BACKGROUND OF THE INVENTION

The present invention relates to an apparatus for relieving an electric stress of a cable at its connection.

There have been proposed in the prior art various stress relief devices for cable terminations. One of such devices is composed of an insulating tape wound on the cable insulation into a conical shape and a conductive layer provided thereon. This construction has the disadvantage that the insulating tape has a tendency of slipping off with the course of time. Another stress relief apparatus comprises a tubular body made of a thermosetting resin having a stress relief cone embedded therein. The tubular body is fitted on the cable insulation, and the stress relief cone is electrically connected to the shielding layer on the cable insulation.

In this case an air gap exists between the cable insulation and the tubular body and there often occur partial discharges. Furthermore, a high electric field concentrates at the edge of the stress relief cone so that it is impossible to raise the dielectric strength of the cable termination.

OBJECTS OF THE INVENTION

It is an object of the present invention to provide a new and improved stress relief apparatus which avoids the disadvantages of the prior apparatus.

It is another object of the invention to assure intimate contact of the tubular body having a stress relief cone with the cable insulation.

It is a further object of the invention to control the concentration of the electric field.

It is a further object of the invention to form the optimal equipotential surfaces.

SUMMARY OF THE INVENTION

In accordance with the invention, a stress relief apparatus for connection of a cable having a solid insulation on the conductor, a shielding layer on said cable insulation and a plastic sheath comprises a tubular body made of an elastic insulating material having an axial bore adapted to be fitted on said cable in contacting relation with said cable insulation and having an outer peripheral surface tapered at both ends into generally conical shapes, a stress relief cone made of an elastic conductive material formed integral with said tubular body and having a conical portion and a cylindrical portion, at least a part of said cylindrical portion protruding from one end of said tubular body, a conductive member for electrically connecting the cylindrical portion of said stress relief cone to said shield layer, a solid support cylinder made of an insulating material having a conical inner surface corresponding substantially to the conical shape of the other end of said tubular body, an annular stress relief electrode embedded in said support cylinder in such a manner that it comes on an extension of the conical surface of said stress relief cone, a clamping means having a conical surface corresponding substantially to the conical shape of the one end of said tubular body, a means for urging said clamping means against said support cylinder to axially compress said tubular body, and a means for grounding said stress relief electrode.

BRIEF DESCRIPTION OF THE DRAWINGS

In the drawings:

FIG. 1 schematically shows a cable termination, partly in section, provided with a stress relief apparatus according to the invention, FIG. 2 shows a modification of FIG. 1, FIG. 3a illustrates the tubular body, in section, of the stress relief apparatus, FIG. 3b is a diagram of compression characteristics thereof, FIG. 5 is a sectional view, taken along line V—V of FIG. 4.

In the drawings throughout, similar or corresponding parts are designated with same reference characters.

DESCRIPTION OF PREFERRED EMBODIMENTS

Figure 4:
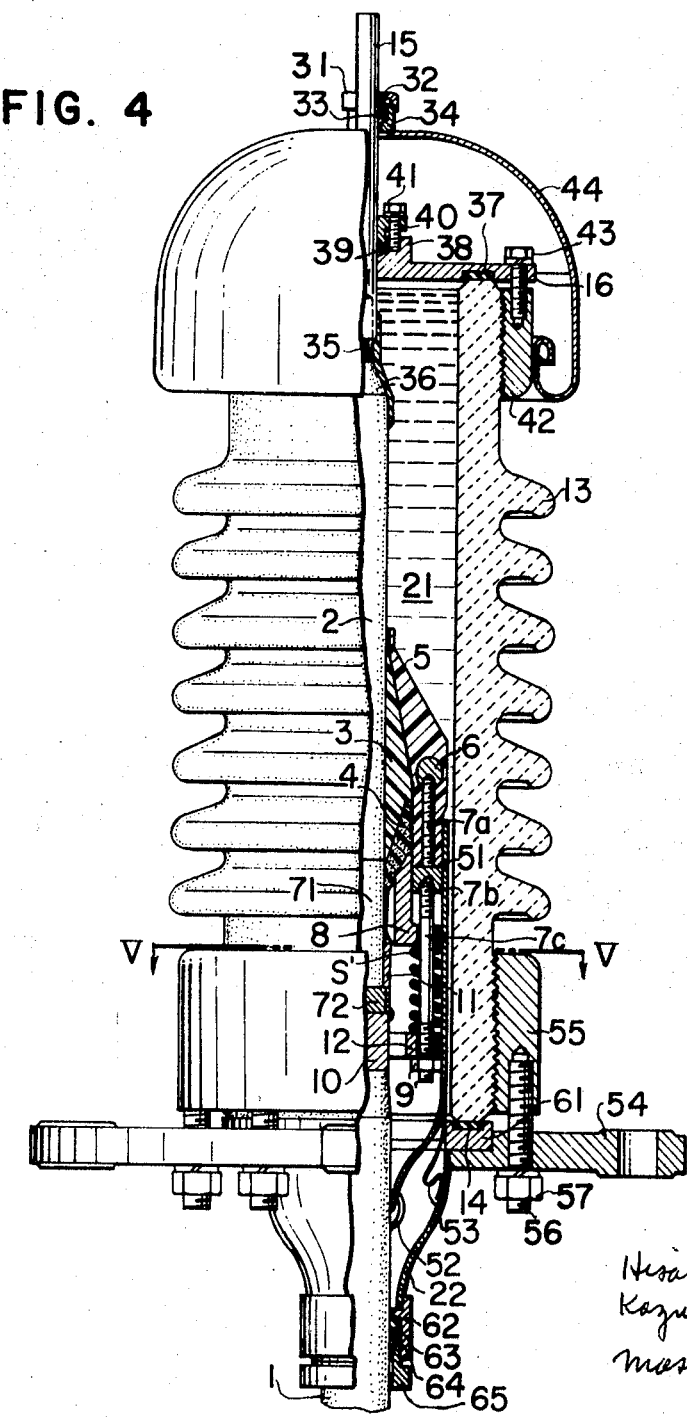
FIG. 4 illustrates another embodiment of the invention.

Referring now to FIGS. 1 and 2, a plastic sheathed cable 1 insulated with a plastic material 2 such as cross-linked polyethylene is received at its termination intimately in the axial bore of an elastic tubular body 3 made of a rubberlike material having an outer peripheral surface tapered at both ends into generally conical shapes and comprising an elastic stress relief cone 4 made of for example, conductive rubber embedded therein. The diameter of the axial bore of the tubular body is selected slightly smaller than the outer diameter of the cable insulation 2. The elastic tubular body 3, which has a conical portion and a cylindrical portion, can be prefabricated in a factory integral with the stress relief cone 4 in such a manner that the cylindrical portion of cone 4 protrudes from an end of the tubular body 3. A solid support cylinder 5 is made of a thermosetting resin such as epoxy resin so as to have a high mechanical strength and an annular stress relief electrode 6 embedded therein. The support cylinder 5 having the electrode 6 embedded therein also can be so prefabricated in a factory as to have a conical inner surface corresponding to one of conical ends of the elastic tubular body 3. The stress relief electrode 6 is rounded off at its outer edge to have a relatively large radius of curvature R and is so located in the support cylinder 5 that the electrode 6 in the assembled condition, as shown in the Figures, lies substantially on an extension of the conical surface of the stress relief cone 4. Thus the equipotential surfaces owing to such an arrangement of the cone 4 and the electrode 6 may take optimal courses as shown with broken lines $P_1$, $P_2$ and $P_3$ FIG. 2. Bolts 7 are embedded integral with the stress relief electrode 6 in the support cylinder 5. An annular clamping member 8 having a conical surface in abutting relationship to the other conical end of the elastic tubular body 3 is passed through by the bolts 7, and, upon tightening nuts 9 put on the bolts 7, exerts together with the support cylinder 5 an axial compression on the elastic tubular body 3. The elastic tubular body 3 is brought into intimate contact with the support cylinder 5 at the conical surface b as well as the outer surface a of the cable insulation 2 thereby preventing partial discharges from occurring. Since the electric field has a tendency of concentrating on the transition region from the cylindrical portion to the portion of the stress relief cone 4, it is desirable to improve a contacting condition at this region. For this purpose, the relative arrangement between the elastic tubular body 3 and the clamping member 8 is so selected that an extension of the cross section of the stress relief cone 4 passing through the above transition region intersects the conical surface of the tubular body 3 in contact with the clamping member 8.

In FIG. 2, a metallic retainer ring 12 which serves as a spring rest and a grounding conductor for the stress relief electrode 6, instead of the clamping member 8 is passed through by the bolts 7, and a compression spring S is disposed concentrically with the cable between the clamping member 8 and the retainer ring 12.

The exposed cylindrical portion of the stress relief cone 4 and a shielding layer 10 on the cable insulation 2 is electrically connected by means of an electrically conductive tape 11 wound over said cylindrical portion and stress relief cone.

The stress relief assembly is housed in a porcelain insulator housing 13, whose lower end is closed by a lower cover 22 bolted through interposition of a gasket 14 to a lower metal fitting cemented around the housing 13. The opening of the lower cover 22, through which the cable 1 is passed, is sealed by a known means. The housing 13 is filled with an insulating compound 21. The upper end of the housing 13 is closed by an upper cover 16 bolted as by bolts 43 through interposition of a gasket 37 to an upper metal fitting 42 cemented around the housing 13. A terminal conductor 15 connected to the cable conductor passes tightly through the upper cover 16. For sealing the pass-through portion of the cover 16, a top tubular part of the cover 16 receives washer rings 18, 19 and a gasket 17 put therebetween. A ring nut 20 is screwed into the top tubular part.

As will be easily understood from the foregoing, the stress relief apparatus of the invention prefabricated in a factory may be mounted on a cable at the field. The relative arrangement between the stress relief electrode 6 in the support cylinder 5 and the stress relief cone 4 in the elastic tubular body 3 makes it possible to relieve the electric stress at the end of the cone as well as the transition region from the cylindrical portion thereof and, conjointly with the intimate contact of the elastic tubular body 3 with the cable insulation 2, to improve the dielectric strength of the cable termination.

The elastic tubular body 3 having the stress relief cone 4 may preferably be made of an elastomer having a Shore hardness less than 50. The stress relief cone 4 also may be made of such an elastomer mixed with the powder of a conductive material such as carbon black. The elastic tubular body 3 made of the material mentioned above may easily be fitted on the cable and brought into intimate contact with the cable insulation. Upon axial compression of the tubular body 3 by means of the members 5, 7, 8, 9, 12 and S, a sufficiently large inward compression as indicated with a solid line in FIG. 3b in comparison with that of any conventional tubular body as indicated with a broken line is exerted on the whole contacting surface of the cable insulation. The dielectric strength of the cable termination thus will be remarkably improved.

Another embodiment of the invention is illustrated in FIGS. 4 and 5. The plastic sheathed cable 1 has additionally a semiconductive layer 72 between the cable insulation 2 and the shielding layer 10. Both layers 72 and 10 are stepwise stripped off. On the cable insulation 2 there is provided a conductive layer 71 ranging from the end of the semiconductive layer 72 to the transition region from the cylindrical portion to the conical portion of the stress relief cone 4. Thus partial discharges, which would occur between the cable insulation 2 and the cylindrical portion of the stress relief cone 4 if the intimate contact between them were lost, are effectively prevented. Further, the conductive layer 71 ensures the electric connection between the stress relief cone 4 and the shielding layer 10 if the electrical connection of the conductor tape 11 were lost. As the conductive layer 71, a conductive tape instead of coating may also be wound on the cable insulation 2.

While only one coil spring S in coaxial arrangement with the cable 1 has been used for urging the clamping member 8 axially against the elastic tubular body 3 in FIG. 2, a plurality of coil springs S' of a relatively small outer diameter in circumferential arrangement are used in the embodiment shown in FIGS. 4 and 5. In these Figures, first bolts 7a, which are connected to the stress relief electrode 6 at one ends, are secured at the other ends to an intermediate ring 7b made of a metal. Second bolts 7c, which pass loosely through the flange of the clamping member 8, are screwed at one ends into the intermediate member 7b. As is clear from FIG. 5, six bolts 7c are arranged circumferentially at angular intervals. Around each of the bolts 7c there is put a compression coil spring S' whose one end is supported on the clamping member 8 while the other end thereof is supported on the retainer ring 12. The bolts 7c extend at the other ends through the retainer ring 12. By tightening the nuts 9' received on the extended ends of the bolts 7c the springs S' urge the clamping member 8 axially against the stress relief cone 4. The circumferential arrangement of plural compression springs S' enables the tubular body 3 including the stress cone 4 to be uniformly compressed in the axial direction, and ensures a relatively large thrust against the stress cone 4. The decrease in the axial thrust would be relatively little even if any of springs S' is broken.

The space, in which the parts 7c, 8, S', 12, 9' exist, is covered by means of a casing 51 whose upper edge is bonded to the outer surface of the intermediate ring 7b while its lower edge is fitted on the cable sheath and sealed onto it by means of a sealing tape 52. The insulating compound 21 thus is prevented from entering into this space. The lower cover 22 is at its upper edge welded to a ring 61 carrying the gasket 14, which in turn is pressed against the lower end of the porcelain housing 13 by bolting a mounting flange 54 to a lower metal fitting 55 cemented around the housing 13. For this purpose, a plurality of threaded bolts 56 are fixed in the lower fitting 55 and extend through the mounting flange 54 to receive nuts 57 on their ends, respectively. The contracted lower end of the lower cover 22 is welded to a sleeve member 62 which cooperates with a gasket 63, a washer 64 and a ring nut 65 for sealing. The casing 51 is electrically connected to the lower cover 22 through a grounding conductor 53.

The cable conductor 35 is received in the axial bore at the lower end of the terminal conductor 15, and the exposed portion thereof is covered with an insulating tape 36. The upper cover 16 having the gasket 37 at the portion opposite to the upper edge of the porcelain housing 13 is bolted as by bolts 43 to the upper fitting 42. The upper cover is found at the opening, through which is passed the terminal conductor 15 with a sleeve portion 38, which cooperates with a gasket 39, a gasket retainer 40 and screws 41 for sealing. A shielding cap 44 is put on the top of the housing 13. The opening of the cap 44, through which the terminal conductor 15 extends outwardly, is provided with a sleeve member 34 which cooperates with a gasket 33, a washer 32 and a ring nut 31 for sealing.

Although the present invention has been described by reference to particular embodiments, it will be apparent that many modifications will be devised by those skilled in the art. For example, the present invention may be embodied in a cable connector instead of a cable termination described above.

What is claimed is:

1. A stress relief apparatus in combination with an electrical cable (1) having a solid insulation (2) on the cable conductor, a shielding layer on said cable insulation and a sheath, said apparatus comprising:
   a. a tubular body (3) made of an elastic insulating material having an axial bore adapted to be fitted on the cable in contacting relation with said cable insulation and having an outer peripheral surface tapered at both ends into generally conical shapes;
   b. a stress relief cone (4) made of an elastic conductive material formed integral with said tubular body and having a conical portion and a cylindrical portion, at least a part of said cylindrical portion protruding from one end of said tubular body;
   c. a conductive member for electrically connecting the cylindrical portion of said stress relief cone to said shielding layer;
   d. a solid support cylinder (5) made of an insulating material having a conical inner surface corresponding substantially to the conical shape of the other end of said tubular body, and being of a length shorter than said tubular body;
   e. clamping means (8) having a conical surface corresponding substantially to the conical shape of the one end of said tubular body;
   f. a means for urging said clamping means against said tubular body to axially compress said tubular body, said elastic tubular body being positioned with respect to said clamping member so that na imaginary cross section line through the stress relief cone passing through the inner transition region between the cylindrical portion of the conical portion thereof will intersect the conical surface of said tubular body in contact with said clamping member, said inner transition region is brought into intimate contact with said cable insulation; and,
   g. a conductive layer on said cable insulation extending axially so as to electrically connect said shielding layer with the transition region from the cylindrical portion to the conical portion of said stress relief cone.

2. A stress relief apparatus according to claim 1, wherein said tubular body is made of an elastomer having a Shore hardness less than 50.

3. A stress relief apparatus according to claim 1, wherein an annular stress relief electrode is embedded in said support cylinder in such a manner that it assumes a position in an imaginary extension of the conical surface of said stress relief cone.

* * * * *